United States Patent
Liu et al.

(10) Patent No.: US 12,549,528 B2
(45) Date of Patent: Feb. 10, 2026

(54) METHOD AND APPARATUS FOR SECURITY COMMUNICATION

(71) Applicant: Telefonaktiebolaget LM Ericsson (publ), Stockholm (SE)

(72) Inventors: Daiying Liu, Beijing (CN); Renwang Liu, Beijing (CN); Jun Wang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 330 days.

(21) Appl. No.: 17/918,731

(22) PCT Filed: Apr. 17, 2020

(86) PCT No.: PCT/CN2020/085409
§ 371 (c)(1),
(2) Date: Oct. 13, 2022

(87) PCT Pub. No.: WO2021/208088
PCT Pub. Date: Oct. 21, 2021

(65) Prior Publication Data
US 2023/0239279 A1  Jul. 27, 2023

(51) Int. Cl.
*H04L 9/40* (2022.01)
(52) U.S. Cl.
CPC ............... *H04L 63/0485* (2013.01)
(58) Field of Classification Search
USPC ....................................................... 713/160
See application file for complete search history.

(56) References Cited

U.S. PATENT DOCUMENTS 9,503,265 B2 * 11/2016 Mundra ................. H04L 63/08
2002/0188871 A1  12/2002 Noehring et al.
(Continued)

FOREIGN PATENT DOCUMENTS

CN  1921440 A * 2/2007 ......... H04L 12/2856
CN  103297348 A  9/2013
(Continued)

OTHER PUBLICATIONS

Kent, S., "IP Encapsulating Security Payload (ESP)", Request For Comments (RFC): 4303, Network Working Group, BBN Technologies, Dec. 2005; consisting of 44 pages.
(Continued)

*Primary Examiner* — Sakinah White Taylor
(74) *Attorney, Agent, or Firm* — Weisberg I.P. Law, P.A.

(57) ABSTRACT

Methods and apparatuses for security communication. A method performed by a first communication device includes determining whether a length of an Internet protocol, IP, datagram is larger than a threshold. The method further includes, when the length of the IP datagram is larger than the threshold, fragmenting the IP datagram into two or more IP packets. The length of each of two or more IP packets is not larger than the threshold and each of the two or more IP packets is filled with fragmentation information. The method further includes processing the two or more IP packets to generate two or more corresponding IP security, IPsec, packets. The method further includes sending the two or more corresponding IPsec packets to a second communication device.

16 Claims, 9 Drawing Sheets

(56) References Cited

U.S. PATENT DOCUMENTS

| | | | | |
|---|---|---|---|---|
| 2003/0196081 A1* | 10/2003 | Savarda | ............... | H04L 63/164 |
| | | | | 713/160 |
| 2008/0075073 A1 | 3/2008 | Swartz | | |
| 2009/0249059 A1 | 10/2009 | Asano | | |
| 2013/0003553 A1* | 1/2013 | Samuels | ............... | H04L 41/00 |
| | | | | 370/235 |
| 2019/0141572 A1* | 5/2019 | Zaks | ................... | H04W 12/106 |
| 2019/0372948 A1* | 12/2019 | Varghese | ............ | H04L 63/0485 |

FOREIGN PATENT DOCUMENTS

| | | | | | |
|---|---|---|---|---|---|
| CN | 104283854 | A | | 1/2015 | |
| CN | 110313160 | A | * | 10/2018 | ............. H04L 47/36 |
| JP | 2005039602 | A | * | 2/2005 | |
| JP | 2007135035 | A | * | 5/2007 | |
| JP | 2007173959 | A | * | 7/2007 | |
| JP | 2010011344 | A | | 1/2010 | |
| WO | WO-02102027 | A1 | * | 12/2002 | ............ H04L 63/164 |

OTHER PUBLICATIONS

Postel, J., "Internet Protocol", Darpa Internet Program, Protocol Specification, Request For Comments (RFC): 791, Marina Del Rey, California, Sep. 1981; consisting of 51 pages.

EPO Communication with Supplementary European Search Report dated May 15, 2023 for Patent Application No. 20930813.9, consisting of 6-pages.

Kent, S., "Security Architecture for the Internet Protocol", Request For Comments (RFC): 2401, Network Working Group, BBN Corp., Nov. 1998; consisting of 56-pages.

3GPP TSG-RAN WG3 #55bis R3-070616; Title: IP Fragmentation; Agenda Item: 7.2.2; Source: Ericsson; Document for: Discussion, decision; Date and Location: Mar. 27-30, 2007, St. Julian, Malta, consisting of 8-pages.

Kent, S., "IP Encapsulating Security Payload (ESP)", Request For Comments (RFC): 2406, Network Working Group, BBN Corp., Nov. 1998; consisting of 23-pages.

Piriyath. S. et al., "Path Maximum Transmission Unit Discovery (PMTUD) For IPsec Tunnels Using The Internet Key Exchange Protocol (IKE) Version 2" draft-spiriyath-ipsecme-dynamic-ipec-pmtu-00, Internet -Draft, IPSECME Working Group, Juniper Networks, Jan. 17, 2018; consisting of 9-pages.

International Search Report and Written Opinion dated Jan. 15, 2021 for International Application No. PCT/CN2020/085409 filed Apr. 17, 2020; consisting of 7 pages.

* cited by examiner

METHOD AND APPARATUS FOR SECURITY COMMUNICATION

CROSS-REFERENCE TO RELATED APPLICATIONS

This application is a Submission Under 35 U.S.C. § 371 for U.S. National Stage Patent Application of International Application Number: PCT/CN2020/085409, filed Apr. 17, 2020 entitled "METHOD AND APPARATUS FOR SECURITY COMMUNICATION," the entirety of which is incorporated herein by reference.

TECHNICAL FIELD

The non-limiting and exemplary embodiments of the present disclosure generally relate to the technical field of communications, and specifically to methods and apparatuses for security communication.

BACKGROUND

This section introduces aspects that may facilitate a better understanding of the disclosure. Accordingly, the statements of this section are to be read in this light and are not to be understood as admissions about what is in the prior art or what is not in the prior art.

In a communication network, a security communication between two communication devices may be provided according to various communication protocols. For example, Internet protocol (IP) security (IPsec) protocol can provide security services for IP packets such as encrypting sensitive data, authentication, protection against replay and data confidentiality. Encapsulating Security Payload (ESP) and Authentication Header (AH) are two IPsec security protocols used to provide these security services.

IPsec can be configured to operate in two different modes: tunnel mode and transport mode. Use of each mode may depend on requirements and implementation of IPsec. IPsec tunnel mode may be a default mode. With the tunnel mode, the entire original IP packet may be protected by IPsec. This means IPsec wraps the original packet, encrypts it, adds a new IP header and sends it to the other side of the VPN (Virtual Private Network) tunnel (e.g., IPsec peer). Tunnel mode may be used between gateways, or at an end-station to a gateway, the gateway acting as a proxy for the hosts behind it. Tunnel mode is used to encrypt traffic between secure IPsec Gateways. IPsec transport mode may be used for end-to-end communications, for example, for communication between a client and a server or between a workstation and a gateway (if the gateway is being treated as a host). Transport mode provides the protection of IP payload which may include TCP/UDP (Transmission Control Protocol/ User Datagram Protocol) header+data, through an AH or ESP header. The payload is encapsulated by the IPsec headers and trailers. The original IP headers remain intact, except that the IP protocol field is changed to ESP (50) or AH (51), and the original protocol value is saved in the IPsec trailer to be restored when the packet is decrypted.

Request for Comments (RFC) 4303 (December 2005), the disclosure of which is incorporated by reference herein in its entirety, defines IP Encapsulating Security Payload (ESP). RFC 4303 (December 2005) describes how to handle big size data packets. For example, If necessary, fragmentation is performed after ESP processing within an IPsec implementation. Thus, transport mode ESP is applied only to whole IP datagrams (not to IP fragments). An IP packet to which ESP has been applied may itself be fragmented by routers en route, and such fragments must be reassembled prior to ESP processing at a receiver. In tunnel mode, ESP is applied to an IP packet, which may be a fragment of an IP datagram. An ESP implementation may choose to not support fragmentation and may mark transmitted packets with the Don't Fragment (DF) bit, to facilitate PMTU (Path MTU (maximum transmission unit)) discovery.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

However RFC 4303 (December 2005) does not define what and how to do for big size packets to adapt to some scenarios.

For example, in IPsec tunnel mode, the ESP packets may be fragmented by a communication device such as router on a way to an IPsec peer in an untrusted network. Moreover, it is hard to know the MTU of every communication device such as router in the untrusted network, even if those communication devices don't support PMTU protocol. In addition, some ESP receivers do not support ESP packets reassembly due to various reasons such as IPsec performance. In this case, the fragments could not be decrypted since it is not completed. This case may result in stopping the service traffic going through the IPsec tunnel.

Some IPsec implementation may take an advantage of hardware (HW) engine (such as ASIC (Application Specific Integrated Circuit) chips, FPGA (Field Programmable Gate Array), etc.) for packet encryption/decryption to improve throughput. However, the HW engine may have a data length limitation, for example which can't reach jumbo frame size 9000 bytes in a general way, considering the performance and HW resource. In this case, if the data packet, which will go through the IPsec tunnel, size is larger than a threshold, the packets should be dropped.

To overcome or mitigate at least one of the above mentioned problems or other problems, the embodiments of the present disclosure propose an improved IPsec solution which can guarantee a data connectivity between two communication devices.

In a first aspect of the disclosure, there is provided a method performed by a first communication device. The method comprises determining whether a length of an Internet protocol, IP, datagram is larger than a threshold. The method further comprises, when the length of the IP datagram is larger than the threshold, fragmenting the IP datagram into two or more IP packets. The length of each of two or more IP packets is not larger than the threshold and each of the two or more IP packets is filled with fragmentation information. The method further comprises processing the two or more IP packets to generate two or more corresponding IP security, IPsec, packets. The method further comprises sending the two or more corresponding IPsec packets to a second communication device.

In an embodiment, the threshold may comprise at least one of a value of a path maximum transmission unit, PMTU, subtracting an IPsec packet encapsulation overhead; and a max data length value supported by a hardware of the first communication device, wherein the hardware is used for packet encryption and decryption when processing the two or more IP packets to generate two or more corresponding IPsec packets.

In an embodiment, the IPsec packet encapsulation overhead may include at least one of an encapsulate security payload, ESP, header length, a tunnel IP header length, an ESP trailer length and an algorithm integrity check value, ICV, length.

In an embodiment, when the threshold comprises two or more different thresholds, a minimum of the two or more different thresholds may be selected as the threshold.

In an embodiment, the method may further comprise, when the length of the IP datagram is not larger than the threshold, processing the IP datagram to generate a corresponding IPsec packets; and sending the corresponding IPsec packet to the second communication device.

In an embodiment, the method may further comprise obtaining the threshold.

In an embodiment, the first communication device may be an end point of an IPsec tunnel and the second communication device may be the other end point of the IPsec tunnel.

In an embodiment, the first communication device may be an end point of an IPsec tunnel.

In an embodiment, the second communication device may be an end point of an IPsec tunnel.

In an embodiment, the two or more corresponding IPsec packets may be encapsulate security payload, ESP, packets.

In an embodiment, the first communication device is one of a communicating host, a communicating security gateway, a router or a server.

In an embodiment, the second communication device is one of a communicating host, a communicating security gateway, a router or a server.

In a second aspect of the disclosure, there is provided a method performed by a second communication device. The method comprises receiving two or more Internet protocol, IP, security, IPsec, packets from a first communication device. The method further comprises processing the two or more IPsec packets to obtain two or more corresponding IP packets. The two or more corresponding IP packets are fragments of an IP datagram and are generated by fragmenting the IP datagram into the two or more corresponding IP packets when a length of the IP datagram is larger than a threshold, wherein the length of each of the two or more corresponding IP packets is not larger than the threshold and each of the two or more corresponding IP packets is filled with fragmentation information.

In a third aspect of the disclosure, there is provided a first communication device. The first communication device comprises a processor; and a memory coupled to the processor, said memory containing instructions executable by said processor, whereby said first communication device is operative to determine whether a length of an Internet protocol, IP, datagram is larger than a threshold. Said first communication device is further operative to, when the length of the IP datagram is larger than the threshold, fragment the IP datagram into two or more IP packets. The length of each of two or more IP packets is not larger than the threshold and each of the two or more IP packets is filled with fragmentation information. Said first communication device is further operative to process the two or more IP packets to generate two or more corresponding IP security, IPsec, packets. Said first communication device is further operative to send the two or more corresponding IPsec packets to a second communication device.

In a fourth aspect of the disclosure, there is provided a second communication device. The second communication device comprises a processor; and a memory coupled to the processor, said memory containing instructions executable by said processor, whereby said second communication device is operative to receive two or more Internet protocol, IP, security, IPsec, packets from a first communication device. Said second communication device is further operative to process the two or more IPsec packets to obtain two or more corresponding IP packets. The two or more corresponding IP packets are fragments of an IP datagram and are generated by fragmenting the IP datagram into the two or more corresponding IP packets when a length of the IP datagram is larger than a threshold, wherein the length of each of the two or more corresponding IP packets is not larger than the threshold and each of the two or more corresponding IP packets is filled with fragmentation information.

In a fifth aspect of the disclosure, there is provided a first communication device. The first communication device comprises a determining module, a fragmenting module, a processing module and a sending module. The determining module may be configured to determine whether a length of an Internet protocol, IP, datagram is larger than a threshold. The fragmenting module may be configured to, when the length of the IP datagram is larger than the threshold, fragment the IP datagram into two or more IP packets, wherein the length of each of two or more IP packets is not larger than the threshold and each of the two or more IP packets is filled with fragmentation information. The processing module may be configured to process the two or more IP packets to generate two or more corresponding IP security, IPsec, packets. The sending module may be configured to send the two or more corresponding IPsec packets to a second communication device.

In a sixth aspect of the disclosure, there is provided a second communication device. The second communication device comprises a receiving module and a processing module. The receiving module may be configured to receive two or more Internet protocol, IP, security, IPsec, packets from a first communication device. The processing module may be configured to process the two or more IPsec packets to obtain two or more corresponding IP packets. The two or more corresponding IP packets are fragments of an IP datagram and are generated by fragmenting the IP datagram into the two or more corresponding IP packets when a length of the IP datagram is larger than a threshold, wherein the length of each of the two or more corresponding IP packets is not larger than the threshold and each of the two or more corresponding IP packets is filled with fragmentation information.

In a seventh aspect of the disclosure, there is provided a computer program product, comprising instructions which, when executed on at least one processor, cause the at least one processor to carry out the method according to any of the above first to second aspects.

In an eighth aspect of the disclosure, there is provided a computer-readable storage medium storing instructions which when executed by at least one processor, cause the at least one processor to carry out the method according to any of the above first to second aspects.

Embodiments herein afford many advantages, of which a non-exhaustive list of examples follows. Some embodiments herein can solve at least one of the above mentioned problems. Some embodiments herein can perform fragmentation before ESP processing, which can guarantee that fragmentation is not performed after ESP processing within an IPsec implementation. Since there is no fragmentation after ESP processing, the ESP receiver can correctly process the ESP packet no matter whether the ESP receiver supports ESP packets reassembly or not. This may be benefit for improving performance and reducing resource consumption since fragmentation, whether performed by an IPsec implementation or by routers along the path between IPsec peers, significantly reduces performance. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
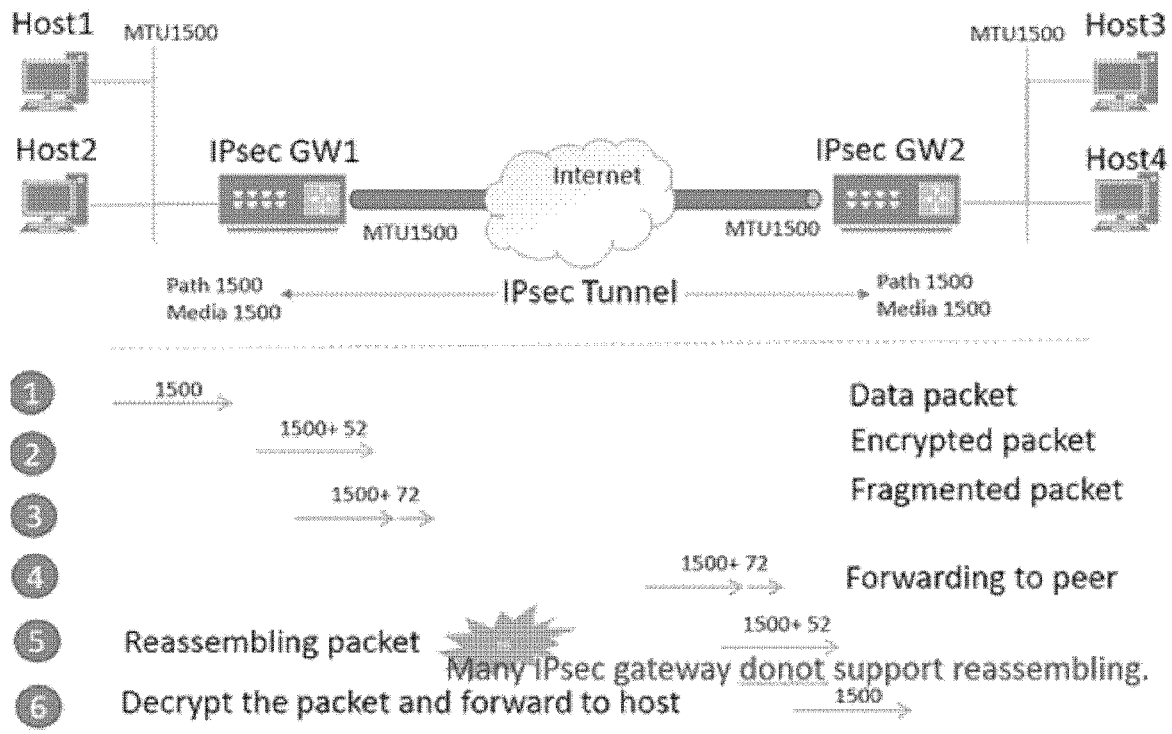
FIG. 1 is a diagram illustrating an exemplary communication system according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable (wireless or wired) communication standards. In the following description, the terms "network" and "system" can be used interchangeably. Furthermore, the communications between two communication devices in the network may be performed according to any suitable communication protocols, including, but not limited to, the wireless communication protocols as defined by a standard organization such as 3rd generation partnership project (3GPP) or the wired communication protocols. For example, the communication protocols may comprise various security communication protocols such as IPsec and/or any other protocols either currently known or to be developed in the future.

As used herein, the term "communication device" refers to any electronic equipment that implements communication function. The communication device may operably communicate with another communication device through the network. The communication device may provide various services. The communication device can be implemented in form of hardware, software or their combination, including but not limited to, terminal device, router, gateway, host, cloud computer, distributed communication system, virtual computer, server, personal computer, desktop computer, etc. The communication device may run with any kind of operating system including, but not limited to, Windows, Linux, UNIX, Android, iOS and their variants.

As used herein, the term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a Universal Serial Bus (USB) dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IoT) scenario, a terminal device may represent a machine or other device that can perform monitoring and/or measurements, and transmit the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "has", and/or "includes", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

FIG. 1 is a diagram illustrating an exemplary communication system according to an embodiment of the present disclosure. As shown, the communication system may comprise four hosts: host1, host2, host3 and host4. The communication system may further comprise an IPsec gateway (IPsec GW1) acting as a gateway of host1 and host2 and another IPsec gateway (IPsec GW2) acting as a gateway of host3 and host4. It is noted that there may be any other suitable number of hosts and IPsec gateways in other embodiments.

In the exemplary communication system of FIG. 1, the IPsec tunnel mode is implemented. The IPsec tunnel mode may be used to encrypt traffic between secure IPsec gateways, for example two routers such as IPsec GW1 and IPsec GW2 connected over the Internet via IPsec VPN. In this exemplary communication system, each router acts as an IPsec gateway for their LAN (local area network), providing secure connectivity to a remote network.

Another example of IPsec tunnel mode is an IPsec tunnel between a host and an IPsec gateway (not shown in FIG. 1). The host connects to the IPsec gateway. Traffic from the host is encrypted, encapsulated inside a new IP packet and sent to an IPsec peer. Once decrypted by the IPsec peer, the host's original IP packet is sent to the local network served by the IPsec peer.

As shown in FIG. 1, the MTU of the network is 1500 bytes. At step 1, a host such as host1 may send an IP packet to another host such as host3 and the length of the IP packet is 1500. The IP packet may reach the IPsec GW1 which may generate an encrypted packet such as ESP packet at step 2. The length of the encrypted packet is 1500+52 due to various overhead. At step 3, since the length (i.e., 1552) of the encrypted packet is larger than MTU (i.e., 1500), the IPsec GW1 may fragment the encrypted packet into two fragmented packets, for example, the length of one of two fragmented packets is 1500 bytes and the length of the other one is 72 bytes. At step 4, two fragmented packets are forwarded to the IPsec peer such as IPsec GW2. At step 5, when the IPsec GW2 does not support ESP packets reassembly due to various reasons such as IPsec performance, the fragmented packets could not be decrypted since it is not completed. This case may result in stopping the service traffic going through the IPsec tunnel. When the IPsec GW2 supports ESP packets reassembly, the fragmented packets could be decrypted and forwarded to the host such as host3 at step 6.

Similar to the IPsec tunnel mode, there may be similar problems in the IPsec Transport mode.

Figure 2:
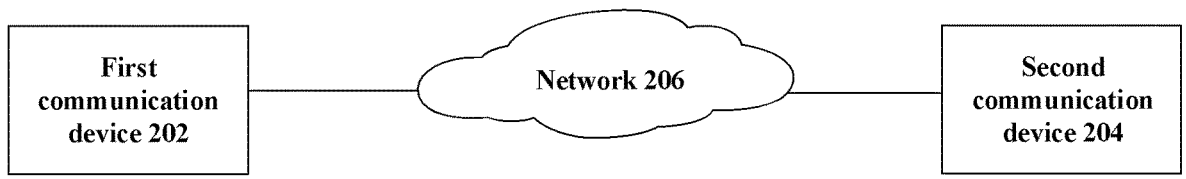
FIG. 2 is a diagram illustrating an exemplary communication system into which an embodiment of the disclosure is applicable.

FIG. 2 is a diagram illustrating an exemplary communication system into which an embodiment of the disclosure is applicable. As shown, the communication system may comprise a first communication device 202 and a second communication device 204. The first communication device 202 is connected with the second communication device through a network 206 such as Internet. The first communication device 202 and the second communication device 204 may be any suitable communication devices which can support the IPsec protocol. As a first example, the first communication device 202 may be a router acting as a gateway of LAN and the second communication device 204 may be a router acting as a gateway of another LAN. As a second example, the first communication device 202 may be a router acting as a gateway of LAN and the second communication device 204 may be a host or client. As a third example, the first communication device 202 may be a host or client and the second communication device 204 may be a router acting as a gateway of LAN. As a fourth example, the first communication device 202 may be a host and the second communication device 204 may be another host. As a fifth example, the first communication device 202 may be a client and the second communication device 204 may be a server.

Figure 3:
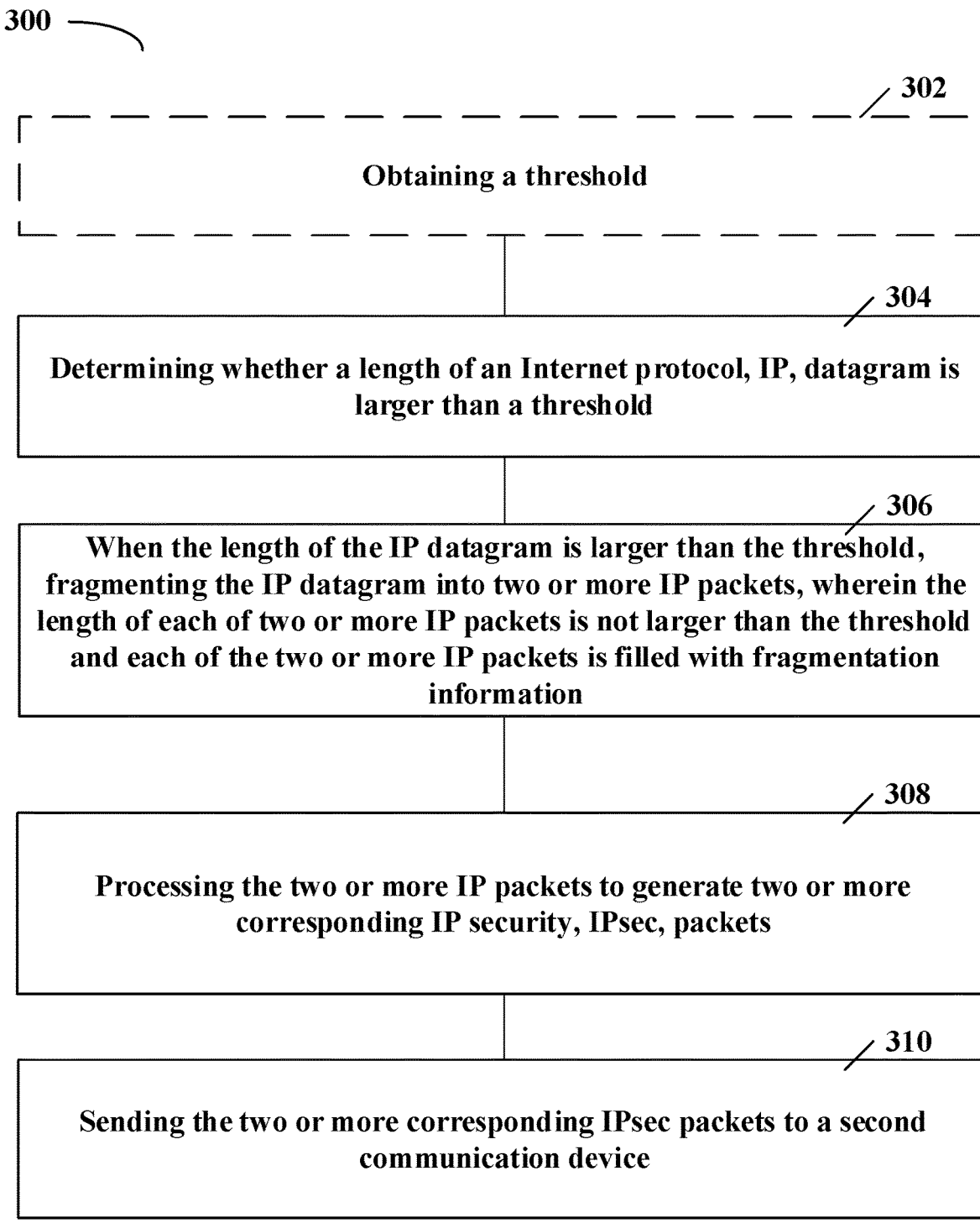
FIG. 3 shows a flowchart of a method according to an embodiment of the present disclosure.

FIG. 3 shows a flowchart of a method 300 according to an embodiment of the present disclosure, which may be performed by an apparatus implemented in or as or communicatively coupled to a first communication device or any other entity having similar functionality. As such, the first communication device may provide means or modules for accomplishing various parts of the method 300 as well as means or modules for accomplishing other processes in conjunction with other components.

At block 302, optionally, the first communication device may obtain a threshold. The threshold may be any suitable threshold. The threshold may be obtained in various ways such as preconfigured by an operator, determined by the first communication device, obtained from a hardware driver of the first communication device, etc.

For example, the threshold may be configured by an operator of the first communication device. The threshold may be determined for example according to network condition and/or communication device requirement.

In an embodiment, the threshold may comprise at least one of a value of a path maximum transmission unit, PMTU subtracting an IPsec packet encapsulation overhead and a max data length value supported by a hardware (such as ASIC, FPGA, etc.) of the first communication device. The hardware is used for packet encryption and decryption when processing the two or more IP packets to generate two or more corresponding IPsec packets.

As used herein, the maximum transmission unit (MTU) is a link layer restriction on the maximum number of bytes of data in a single transmission. PMTU is the smallest MTU of any link on a current path between two communication devices. PMTU may change over time since the route between two communication devices, especially on the Internet, may change over time. PMTU is not necessarily symmetric and can even vary for different types of traffic from the same communication device.

PMTU can be determined by using Path MTU Discovery (PMTU-D). For example, a communication device may send packets that are as large as possible while still avoiding fragmentation. The communication device does this by starting to send packets that have a maximum size of the lesser of the local MTU or the MSS (maximum segment size) announced by a remote communication device. These packets are sent with the DF bit set. If there is some MTU between the two communication devices which is too small to pass the packet successfully, then an ICMP) (Internet Control Messages Protocol) can't fragment error will be sent back to the communication device. It will then know to lower the size. If the ICMP) message includes the next hop MTU, it can pick the correct size for that link immediately, otherwise it has to guess.

The IPsec packet encapsulation overhead can be determined based on the specific IPsec protocol and IPsec operation mode. The max data length value supported by a hardware of the first communication device can be obtained from the driver of the hardware of the first communication device.

Figure 4:
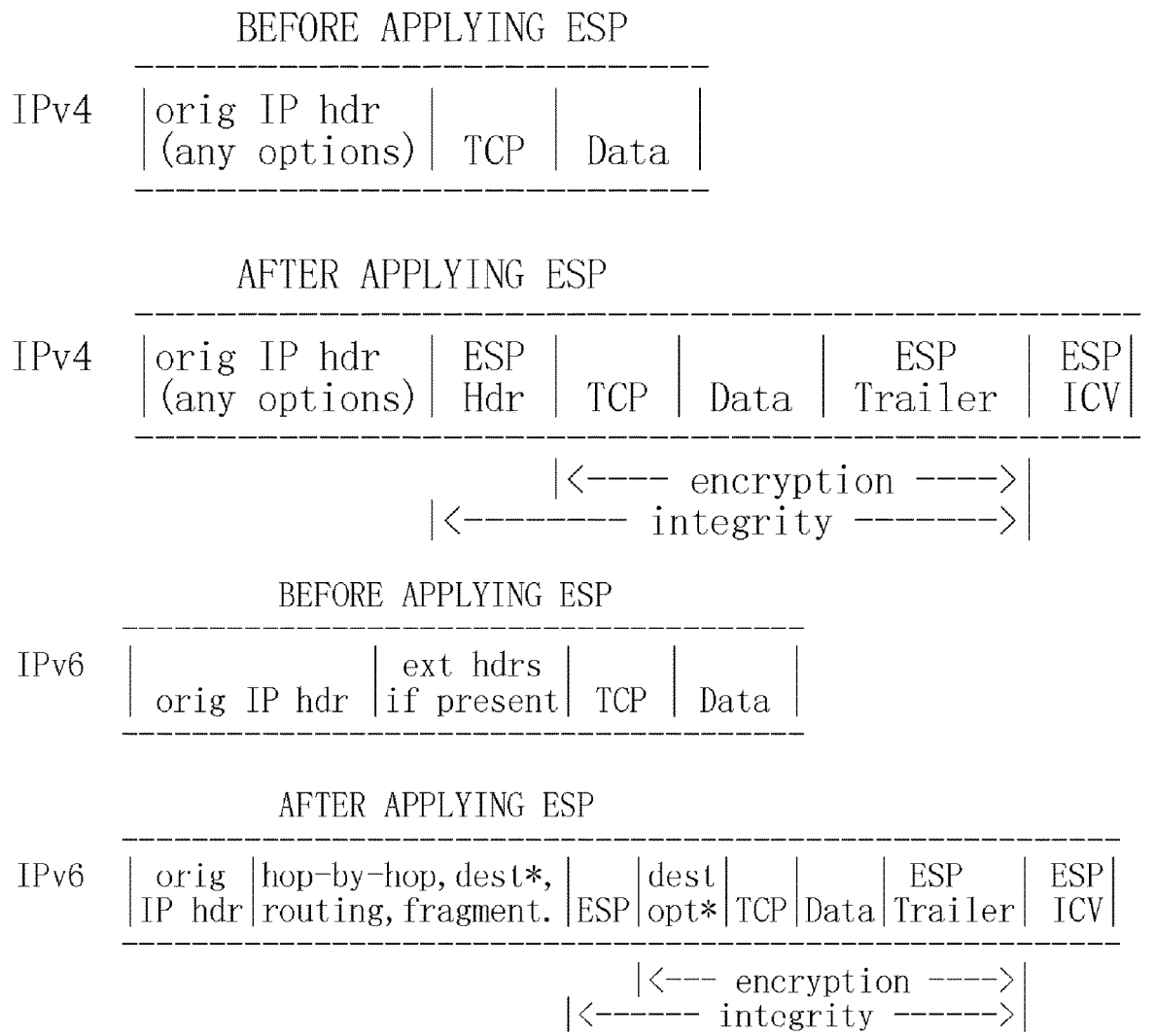
FIG. 4 shows an example of encapsulation overhead of ESP Tunnel Mode Processing according to an embodiment of the present disclosure.
Figure 5:
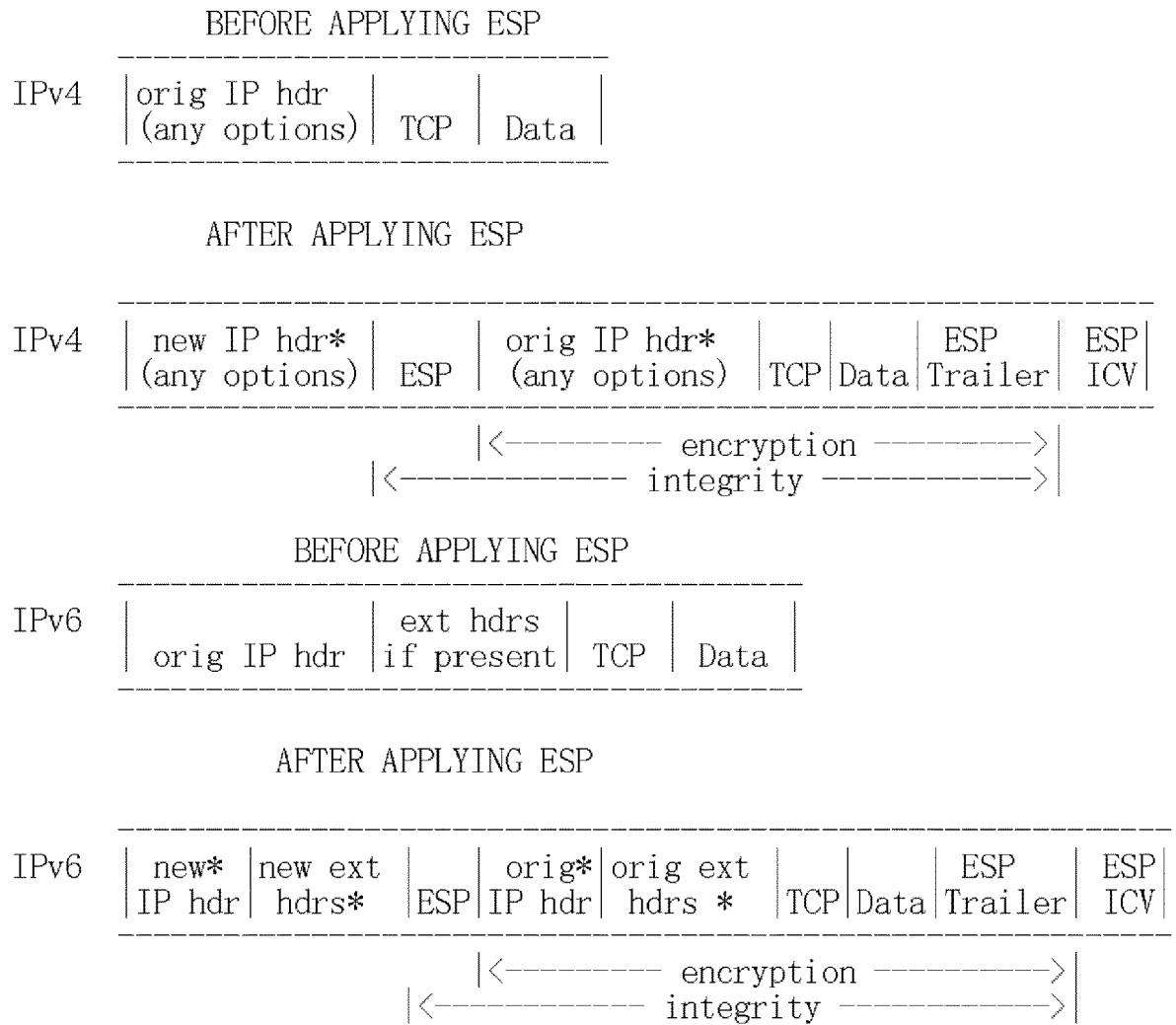
FIG. 5 shows an example of encapsulation overhead of ESP Transport Mode Processing according to an embodiment of the present disclosure.

The IPsec packet encapsulation overhead may refer to the length of any additional bytes after the IPsec packet encapsulation. For example, when the IPsec protocol is ESP, the IPsec packet encapsulation overhead may be same as the encapsulation overhead as described in RFC 4303 (December 2005). FIG. 4 shows an example of encapsulation overhead of ESP Tunnel Mode Processing according to an embodiment of the present disclosure, which is same as the corresponding content as described in RFC 4303 (December 2005). FIG. 5 shows an example of encapsulation overhead of ESP Transport Mode Processing according to an embodiment of the present disclosure, which is same as the corresponding content as described in RFC 4303 (December 2005).

In an embodiment, the IPsec packet encapsulation overhead may include at least one of an encapsulate security payload (ESP) header length, a tunnel IP header length, an ESP trailer length and an algorithm integrity check value (ICV) length. For example, the ESP header, the tunnel IP header length, ESP trailer and the ICV may be similar to the corresponding terms as described in RFC 4303 (December 2005).

In an embodiment, when the threshold comprises two or more different thresholds, a minimum of the two or more different thresholds is selected as the threshold. For example, when the threshold comprises both the value of the PMTU subtracting the IPsec packet encapsulation overhead and the max data length value supported by a hardware of the first communication device, then a minimum of the two thresholds is selected as the threshold.

At block 304, the first communication device may determine whether a length of an Internet protocol (IP) datagram is larger than the threshold. The IP datagram may be received from another communication device such as a host or an application of the first communication device.

At block 306, when the length of the IP datagram is larger than the threshold, the first communication device may fragment the IP datagram into two or more IP packets. The length of each of two or more IP packets is not larger than the threshold and each of the two or more IP packets is filled with fragmentation information. For example, the two or more IP packets may have the same or different length. In an embodiment, the fragmentation operation may follow RFC 791 (September 1981), the disclosure of which is incorporated by reference herein in its entirety.

The first communication device performing the fragmentation may follow a specific algorithm to divide the IP datagram into fragments for transmission. The exact implementation of the fragmentation process may depend on the communication device. For example, to fragment/segment a long IP datagram, the first communication device may create a new IP packet and copies the contents of the IP header fields from the long IP datagram into the new IP header. The data of the long IP datagram is then divided into two or more portions for example on a 8 byte (64 bit) boundary, so that the first packet is less than the threshold. The fragmentation information such as more-fragments flag (MF) in the first packet is set to one (to indicate that more fragments of this packet follow). The second created new packet is then processed. The packet header field of the second created new packet is identical to that of the original packet (including the same value of the packet ID, the total length field, the more-fragments flag (MF) and the fragment offset field in the original packet). The packet header field is updated with a new offset field, by adding the number of payload bytes sent in the first fragment. The procedure is similar for other created new packets.

At block 308, the first communication device may process the two or more IP packets to generate two or more corresponding IPsec packets. For example, the first communication device may process the two or more IP packets to generate two or more corresponding IPsec packets according the specific IPsec protocol such as ESP. When the threshold is the value of PMTU subtracting the IPsec packet encapsulation overhead, the length of each of the two or more corresponding IPsec packets may be not larger than the PMTU. When the threshold comprises two or more different thresholds (including the value of PMTU subtracting the IPsec packet encapsulation overhead) and the minimum of the two or more different thresholds is selected as the threshold, the length of each of the two or more corresponding IPsec packets may be not larger than the minimum of the two or more different thresholds.

In an embodiment, the two or more corresponding IPsec packets may be ESP packets.

At block 310, the first communication device may send the two or more corresponding IPsec packets to a second communication device.

In an embodiment, the first communication device may be an end point of an IPsec tunnel and the second communication device may be the other end point of the IPsec tunnel.

In an embodiment, the first communication device may be an end point of an IPsec tunnel.

In an embodiment, the second communication device may be an end point of an IPsec tunnel.

In an embodiment, the first communication device and the second communication device may be one of a pair of communicating hosts, a pair of communicating security gateways, or a security gateway and a host.

In an embodiment, the first communication device is one of a communicating host, a communicating security gateway, a router or a server.

In an embodiment, the second communication device is one of a communicating host, a communicating security gateway, a router or a server.

Figure 6:
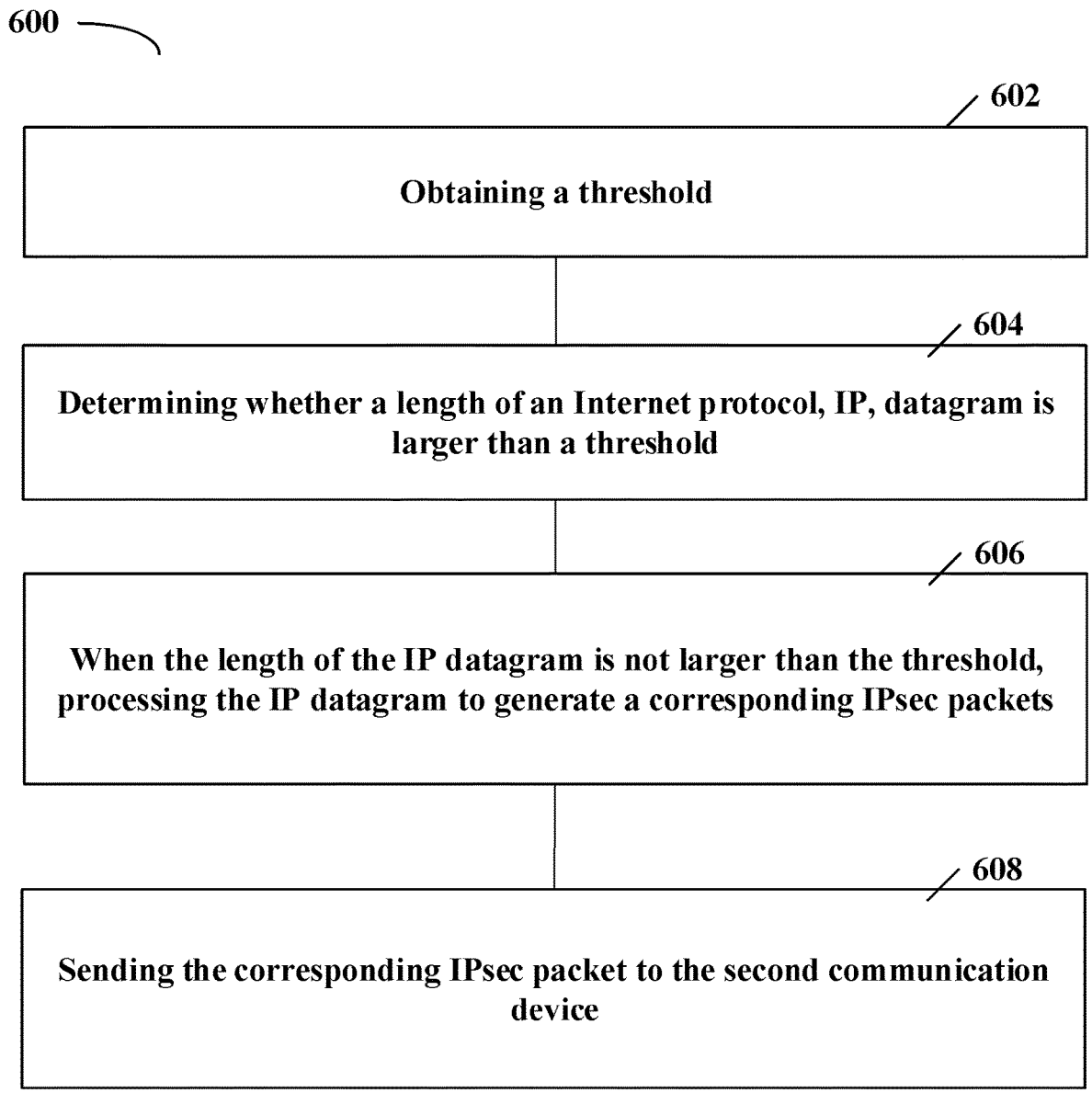
FIG. 6 shows a flowchart of a method according to another embodiment of the present disclosure.

FIG. 6 shows a flowchart of a method 600 according to another embodiment of the present disclosure, which may be performed by an apparatus implemented in or as or communicatively coupled to a first communication device or any other entity having similar functionality. As such, the first communication device may provide means or modules for accomplishing various parts of the method 600 as well as means or modules for accomplishing other processes in conjunction with other components. For some parts which have been described in the above embodiments, detailed description thereof is omitted here for brevity.

At block 602, the first communication device may obtain a threshold. Block 602 is same as block 302 of FIG. 3.

At block 604, the first communication device may determine whether a length of an Internet protocol (IP) datagram is larger than the threshold. Block 604 is same as block 304 of FIG. 3.

At block 606, when the length of the IP datagram is not larger than the threshold, the first communication device may process the IP datagram to generate a corresponding IPsec packets.

At block 608, the first communication device may send the corresponding IPsec packet to the second communication device.

Figure 7:
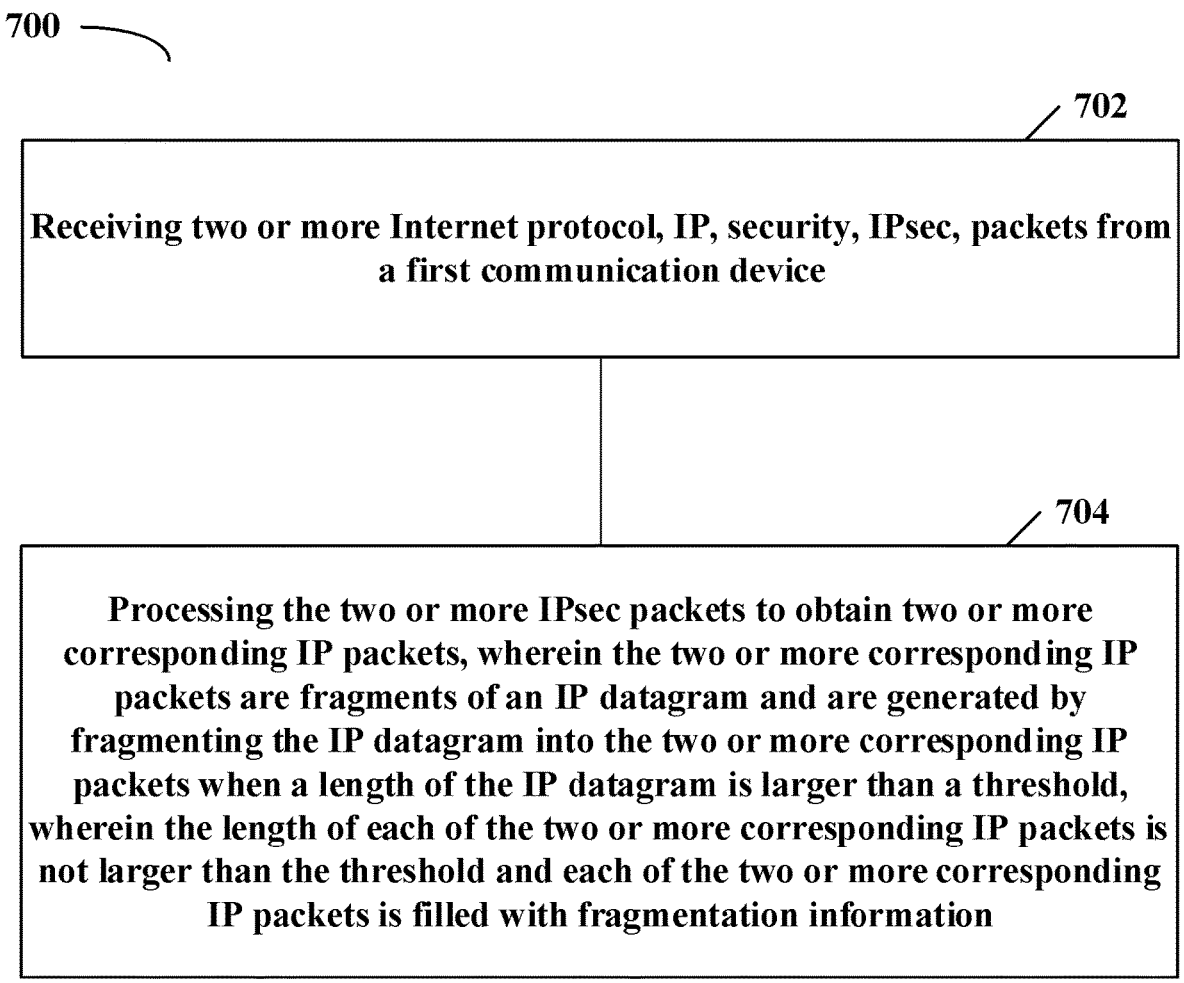
FIG. 7 shows a flowchart of a method according to another embodiment of the present disclosure.

FIG. 7 shows a flowchart of a method 700 according to another embodiment of the present disclosure, which may be performed by an apparatus implemented in or as or communicatively coupled to a second communication device or any other entity having similar functionality. As such, the second communication device may provide means or modules for accomplishing various parts of the method 700 as well as means or modules for accomplishing other processes in conjunction with other components. For some parts which have been described in the above embodiments, detailed description thereof is omitted here for brevity.

At block 702, the second communication device may receive two or more IPsec packets from a first communication device. For example, the first communication device may send the two or more IPsec packets to the second communication device at block 310 of FIG. 3, and the second communication device may receive two or more IPsec packets from the first communication device.

At block 704, the second communication device may process the two or more IPsec packets to obtain two or more corresponding IP packets. For example, the second communication device may decapsulate the ESP packets and decrypt the ESP payload when the two or more IPsec packets are ESP packets. The second communication device may not need to take any other action and just forward the two or more corresponding IP packets to end user. The service application on the end user can reassembly the fragments and handle it.

As described above, the two or more corresponding IP packets are fragments of an IP datagram and are generated by fragmenting the IP datagram into the two or more corresponding IP packets when a length of the IP datagram is larger than a threshold. The length of each of the two or more corresponding IP packets is not larger than the threshold and each of the two or more corresponding IP packets is filled with fragmentation information.

Figure 8:
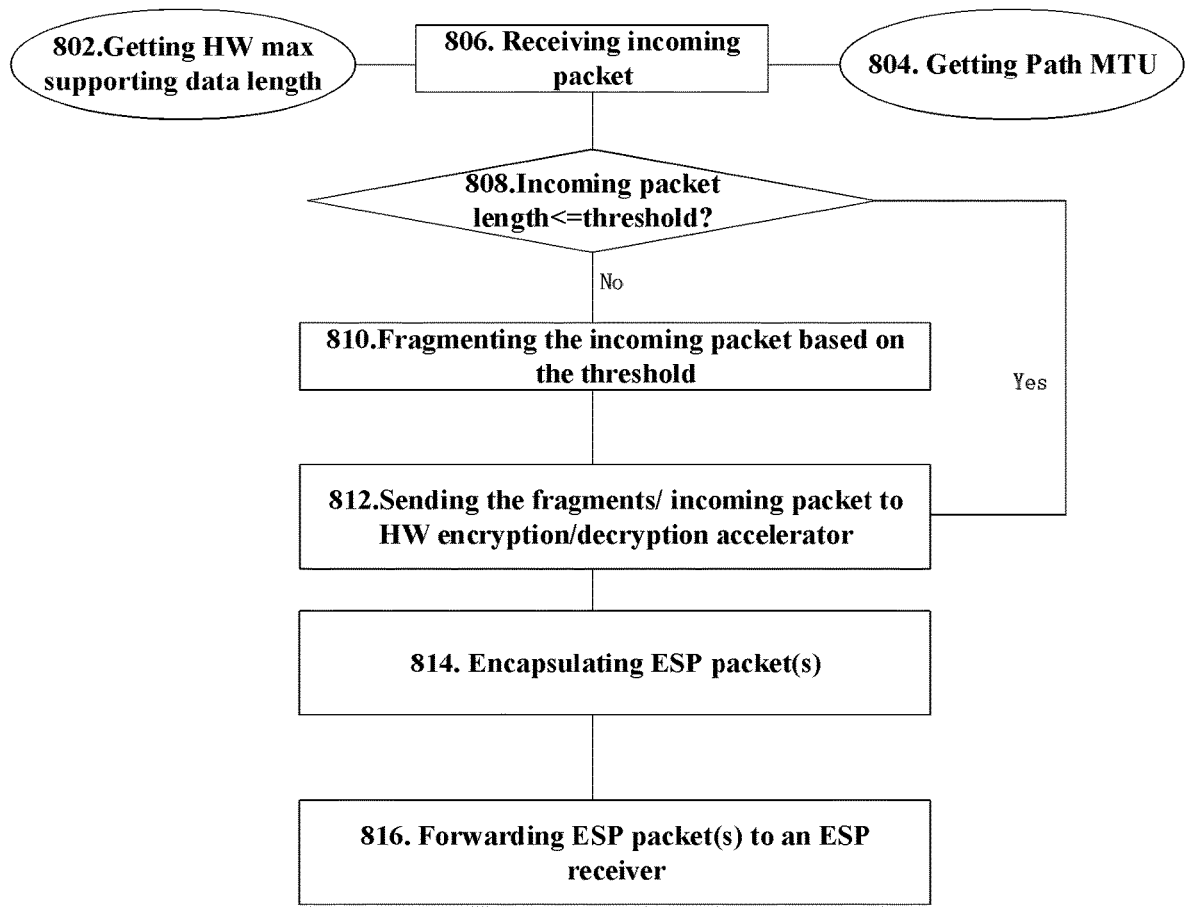
FIG. 8 shows a packet processing procedure on an ESP sender according to an embodiment of the present disclosure.
Figure 9:
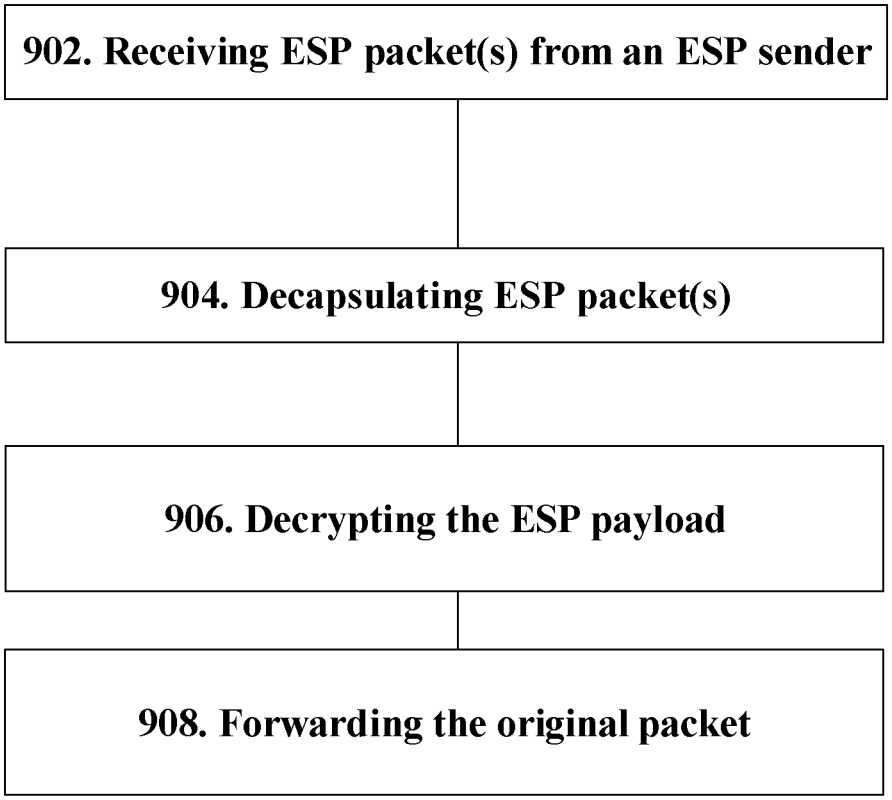
FIG. 9 shows a packet processing procedure on an ESP receiver according to an embodiment of the present disclosure.

FIG. 8 shows a packet processing procedure on an ESP sender according to an embodiment of the present disclosure. FIG. 9 shows a packet processing procedure on an ESP receiver according to an embodiment of the present disclosure.

As shown in FIG. 8, for a scenario of ESP packets being fragmented by the ESP sender (e.g., the first communication device) on the way, the ESP sender may get the allowed max path MTU at step 804 and calculate the packet length threshold as: ((PMTU)−(ESP header length)−(tunnel IP header length)−(ESP tailor length)−(algorithm ICV length)); receive an incoming packet at step 806; compare the incoming packet's length from the IP header with a length threshold at step 808. If the incoming packet's length is not bigger than the length threshold, then the ESP sender just sends the incoming packet to the HW encryption/decryption accelerator at step 812. If the incoming packet's length is bigger than the length threshold, then the ESP sender fragments the incoming packet based on the threshold at step 810, and fill the IP header with the fragmentation information (e.g., fragmentation bit, the offset and so on), and then send the fragments to the HW encryption/decryption accelerator at step 812. The ESP sender may encapsulate ESP packet(s) at step 814. The ESP packet(s) may be forwarded to the ESP receiver through an untrusted network such as Internet at step 816. As shown in FIG. 9, the ESP receiver may receive ESP packet(s) from the ESP sender at step 902; decapsulate ESP packet(s) at step 904 and decrypt the ESP payload at step 906. The ESP receiver may forward the original packet follow the IP forwarding rule at step 908. For example, in a normal case, the original packet is not fragmented, then the ESP receiver does not need to take any other action and just forward it to end user. If the original packet is fragmented, then the ESP receiver also does not need to take any other action and just forward it to end user. The service application on the end user could reassembly the fragments and handle it. It is noted that the ESP receiver does not need to touch packet fragment/reassembly logic.

As shown in FIG. 8, for a scenario of IP packet's length exceed HW encryption/decryption accelerator allowed length, the ESP sender may get the max data length value supported by the HW encryption/decryption accelerator from a driver of the HW encryption/decryption accelerator at step 802 and set the max data length value as the length threshold; receive an incoming packet at step 806; compare the incoming packet's length from the IP header with a length threshold at step 808. If the incoming packet's length is not bigger than the length threshold, then the ESP sender just sends the incoming packet to the HW encryption/decryption accelerator at step 812. If the incoming packet's length is bigger than the length threshold, then the ESP sender fragments the incoming packet based on the threshold at step 810, and fill the IP header with the fragmentation information (e.g., fragmentation bit, the offset and so on), and then send the fragments to the HW encryption/decryption accelerator at step 812. The ESP sender may encapsulate ESP packet(s) at step 814. The ESP packet(s) may be forwarded to the ESP receiver through an untrusted network such as Internet at step 816. As shown in FIG. 9, the ESP receiver may receive ESP packet(s) from the ESP sender at step 902; decapsulate ESP packet(s) at step 904 and decrypt the ESP payload at step 906. The ESP receiver may forward the original packet follow the IP forwarding rule at step 908. For example, in a normal case, the original packet is not fragmented, then the ESP receiver does not need to take any other action and just forward it to end user. If the original packet is fragmented, then the ESP receiver also does not need to take any other action and just forward it to end user. The service application on the end user could reassembly the fragments and handle it. It is noted that the ESP receiver does not need to touch packet fragment/reassembly logic.

In an embodiment, a threshold obtaining module (software or hardware) may be introduced in the first communication device to get a threshold such as path MTU and/or HW encryption/decryption accelerator supporting max data length. For the case "ESP packet could be fragmented on the way", the threshold obtaining module needs to get the PMTU. For the case "Incoming packet data length is bigger than HW encryption/decryption accelerator supporting max value", the threshold obtaining module needs to get the HW encryption/decryption accelerator supporting max value.

In an embodiment, a checking module (software or hardware) may be introduced in the first communication device to check the incoming packet length. The checking module is used to compare the incoming packet's length with the threshold. The comparison may consider at least one of the IP header, ESP header, ESP tailor and algorithm ICV length. If the packet's length is larger than the threshold, the packet may be sent to a fragmentation module. If the packet's data length is not larger than the threshold, the packet may be sent to an encryption/encapsulation module.

In an embodiment, a fragmentation module (software or hardware) may be introduced in the first communication device to fragment an incoming IP packet into two or more IP packets when the length of the incoming IP packet is larger than the threshold. The fragmentation operation may follow RFC 791 (September 1981). The fragmentation module may fragment the packet if its length is larger than the threshold and send all the fragments to an encryption/encapsulation module.

According to various embodiments, IP data packets fragmentation is performed before IPsec encryption/encapsulation.

According to various embodiments, if the length of the incoming packets is larger than the threshold such as the path MTU and/or the HW encryption/decryption accelerator supporting max value, the packet may be fragmented firstly to ensure that it will not be dropped on the way or on the HW.

The various blocks or steps shown in FIGS. 3-10 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Embodiments herein afford many advantages, of which a non-exhaustive list of examples follows. Some embodiments herein can solve at least one of the above mentioned problems. Some embodiments herein can perform fragmentation before ESP processing, which can guarantee that fragmentation is not performed after ESP processing within an IPsec implementation. Since there is no fragmentation after ESP processing, the ESP receiver can correctly process the ESP packet no matter whether the ESP receiver supports ESP packets reassembly or not. This may be benefit for improving performance and reducing resource consumption since fragmentation, whether performed by an IPsec implementation or by routers along the path between IPsec peers, significantly reduces performance. The embodiments herein are not limited to the features and advantages mentioned above. A person skilled in the art will recognize additional features and advantages upon reading the following detailed description.

Figure 10:
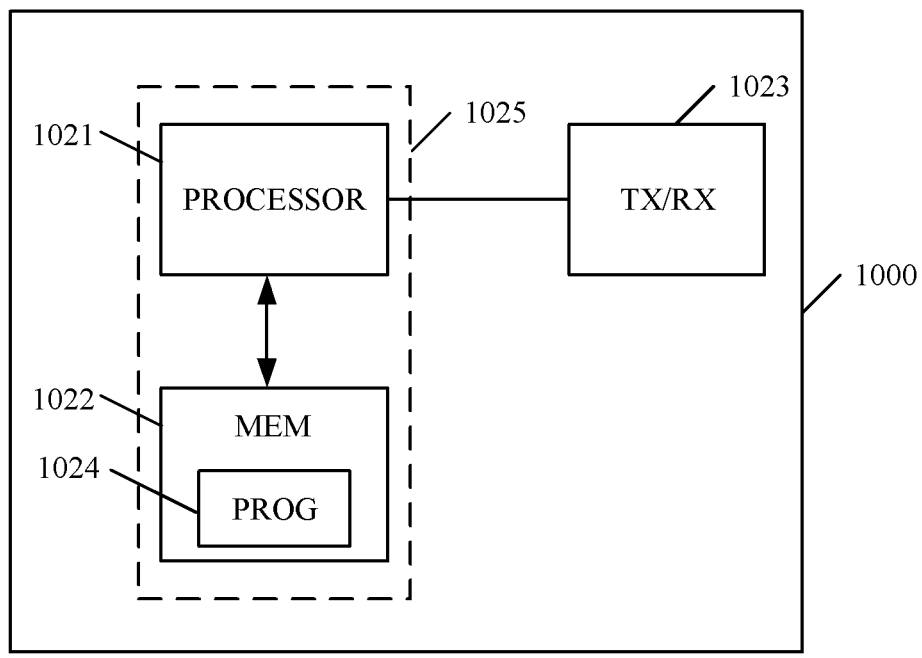
FIG. 10 is a block diagram showing an apparatus suitable for use in practicing some embodiments of the disclosure.

FIG. 10 is a block diagram showing an apparatus suitable for use in practicing some embodiments of the disclosure. For example, any one of the first communication device and the second communication device described above may be implemented through the apparatus 1000.

The apparatus 1000 comprises at least one processor 1021, such as a DP (digital processor), and at least one MEM (memory) 1022 coupled to the processor 1021. The apparatus 1020 may further comprise a transmitter TX and receiver RX 1023 coupled to the processor 1021. The MEM 1022 stores a PROG (program) 1024. The PROG 1024 may include instructions that, when executed on the associated processor 1021, enable the apparatus 1020 to operate in accordance with the embodiments of the present disclosure. A combination of the at least one processor 1021 and the at least one MEM 1022 may form processing means 1025 adapted to implement various embodiments of the present disclosure.

Various embodiments of the present disclosure may be implemented by computer program executable by one or more of the processor 1021, software, firmware, hardware or in a combination thereof.

The MEM 1022 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1021 may be of any type suitable to the local technical environment, and may include one or more of general purpose computers, special purpose computers, microprocessors, digital signal processors DSPs and processors based on multicore processor architecture, as non-limiting examples.

In an embodiment where the apparatus is implemented as or at the first communication device, the memory 1022 contains instructions executable by the processor 1021, whereby the first communication device operates according to any of the methods related to the first communication device as described above.

In an embodiment where the apparatus is implemented as or at the second communication device, the memory 1022 contains instructions executable by the processor 1021, whereby the second communication device operates according to any of the methods related to the second communication device as described above.

Figure 11:
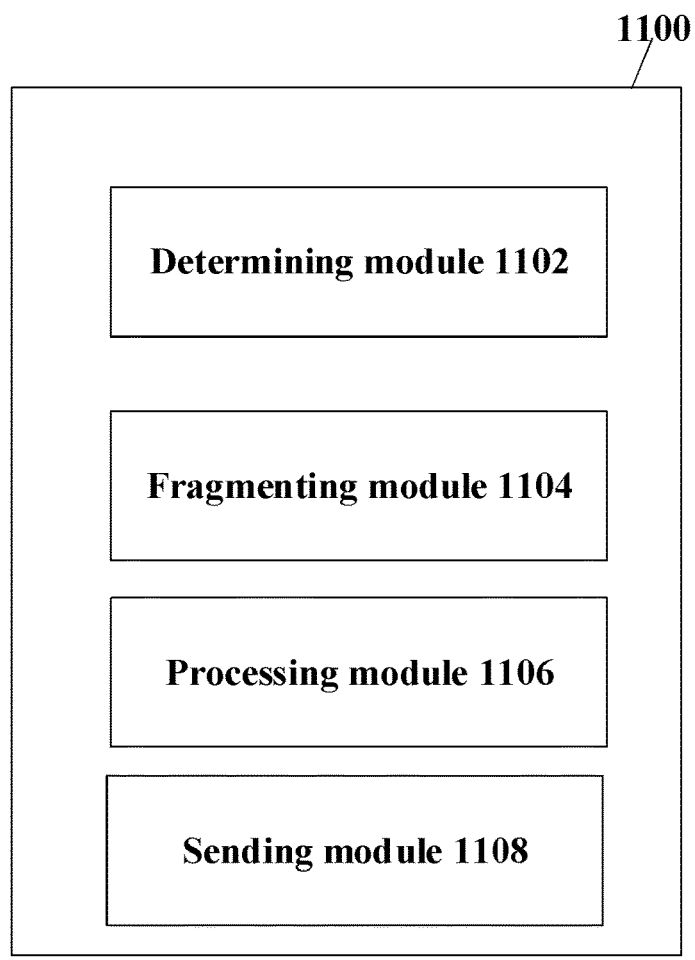
FIG. 11 is a block diagram showing a first communication device according to an embodiment of the disclosure.

FIG. 11 is a block diagram showing a first communication device according to an embodiment of the disclosure. As shown, the first communication device 1100 comprises a determining module 1102, a fragmenting module 1104, a processing module 1106 and a sending module 1108. The determining module 1102 may be configured to determine whether a length of an Internet protocol, IP, datagram is larger than a threshold. The fragmenting module 1104 may be configured to, when the length of the IP datagram is larger than the threshold, fragment the IP datagram into two or more IP packets, wherein the length of each of two or more IP packets is not larger than the threshold and each of the two or more IP packets is filled with fragmentation information. The processing module 1106 may be configured to process the two or more IP packets to generate two or more corresponding IP security, IPsec, packets. The sending module 1108 may be configured to send the two or more corresponding IPsec packets to a second communication device.

Figure 12:
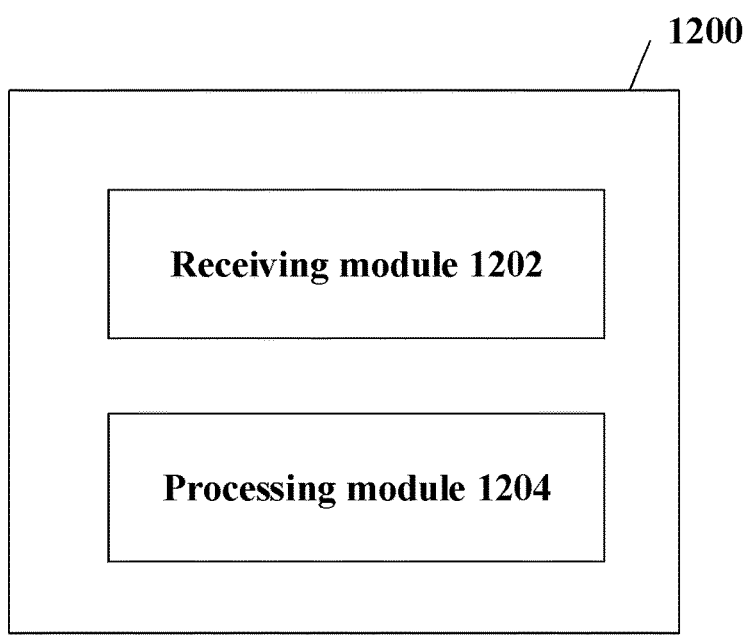
FIG. 12 is a block diagram showing a second communication device according to an embodiment of the disclosure.

FIG. 12 is a block diagram showing a second communication device according to an embodiment of the disclosure. As shown, the second communication device 1200 comprises a receiving module 1202 and a processing module 1204. The receiving module 1202 may be configured to receive two or more Internet protocol, IP, security, IPsec, packets from a first communication device. The processing module 1204 may be configured to process the two or more IPsec packets to obtain two or more corresponding IP packets. The two or more corresponding IP packets are fragments of an IP datagram and are generated by fragmenting the IP datagram into the two or more corresponding IP packets when a length of the IP datagram is larger than a threshold, wherein the length of each of the two or more corresponding IP packets is not larger than the threshold and each of the two or more corresponding IP packets is filled with fragmentation information.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a first communication device, the method comprising:
   determining whether a length of an Internet protocol, IP, datagram is larger than a at least one threshold, the at least one threshold comprises two or more different thresholds, the two or more different thresholds comprising:
      a value of a path maximum transmission unit, PMTU, subtracting an IPsec packet encapsulation overhead; and
      a max data length value supported by a hardware of the first communication device, the hardware is used for packet encryption and decryption when processing the two or more corresponding IP packets to generate the two or more IPsec packets;
   when the length of the IP datagram is larger than the at least one threshold, fragmenting the IP datagram into two or more IP packets, the length of each of two or more IP packets are not larger than the at least one threshold and each of the two or more IP packets is filled with fragmentation information, the fragmentation information comprising a flag in a first IP packet of the two or more IP packets, the flag indicating the IP datagram has been fragmented into at least one other IP packet, the fragmenting occurring before encapsulation security payload, ESP, processing;
   processing the two or more IP packets to generate two or more corresponding IP security, IPsec, packets; and
   sending the two or more corresponding IPsec packets to a second communication device.

2. The method according to claim 1, wherein the IPsec packet encapsulation overhead includes at least one of an ESP header length, a tunnel IP header length, an ESP trailer length and an algorithm integrity check value, ICV, length.

3. The method according to claim 1, wherein when the at least one threshold comprises the two or more different thresholds, a minimum of the two or more different thresholds is selected as the threshold.

4. The method according to claim 1, further comprising:
   when the length of the IP datagram is not larger than the at least one threshold, processing the IP datagram to generate the two or more corresponding IPsec packets; and
   sending the two or more corresponding IPsec packets to the second communication device.

5. The method according to claim 1, further comprising at least one of:
   obtaining the at least one threshold; and
   the first communication device is an end point of an IPsec tunnel; and
   the two or more corresponding IPsec packets are ESP packets; and
   the first communication device is one of:
      a communicating host;
      a communicating security gateway;
      a router; and
      a server.

6. A method performed by a second communication device, the method comprising:
   receiving two or more Internet protocol, IP, security, IPsec, packets from a first communication device; and
   processing the two or more IPsec packets to obtain two or more corresponding IP packets, the two or more corresponding IP packets are fragments of an IP datagram and are generated by fragmenting the IP datagram into the two or more corresponding IP packets when a length of the IP datagram is larger than at least one threshold, the length of each of the two or more corresponding IP packets are not larger than the at least one threshold and each of the two or more corresponding IP packets is filled with fragmentation information, the fragmentation information comprising a flag in a first IP packet of the two or more IP packets, the flag indicating the IP datagram has been fragmented into at least one other IP packet, the fragmenting occurring before encapsulation security payload, ESP, processing; and
   the at least one threshold comprising two or more different thresholds, the two or more different thresholds comprising:
      a value of a path maximum transmission unit, PMTU, subtracting an IPsec packet encapsulation overhead; and
      a max data length value supported by a hardware used for packet encryption and decryption when the two or more IP packets were processed to generate the two or more IPsec packets.

7. The method according to claim 6, wherein the IPsec packet encapsulation overhead includes at least one of an ESP header length, a tunnel IP header length, an ESP trailer length and an algorithm integrity check value, ICV, length.

8. The method according to claim 6, wherein when the at least one threshold comprises two or more different thresholds, a minimum of the two or more different thresholds is selected as the threshold.

9. The method according to claim 6, wherein at least one of:
   the second communication device is an end point of an IPsec tunnel; and
   the two or more IPsec packets are ESP packets; and
   the second communication device is one of:
      a communicating host;
      a communicating security gateway;
      a router; and
      a server.

10. A first communication device, comprising:
a processor; and
a memory coupled to the processor, the memory containing instructions executable by the processor to configure the first communication device to:
  determine whether a length of an Internet protocol, IP, datagram is larger than at least one threshold, the at least one threshold comprises two or more different thresholds, the two or more different thresholds comprising:
    a value of a path maximum transmission unit, PMTU, subtracting an IPsec packet encapsulation overhead; and
    a max data length value supported by a hardware of the first communication device, the hardware is used for packet encryption and decryption when processing the two or more corresponding IP packets to generate the two or more IPsec packets;
  when the length of the IP datagram is larger than the at least one threshold, fragment the IP datagram into process the two or more IP packets to generate two or more corresponding IP security, IPsec, packets two or more IP packets, the length of each of two or more IP packets are not larger than the at least one threshold and each of the two or more IP packets is filled with fragmentation information, the fragmentation information comprising a flag in a first IP packet of the two or more IP packets, the flag indicating the IP datagram has been fragmented into at least one other IP packet, the fragmenting occurring before encapsulation security payload, ESP, processing;
  process the two or more IP packets to generate two or more corresponding IP security, IPsec, packets; and
  send the two or more corresponding IPsec packets to a second communication device.

11. The first communication device according to claim 10, wherein the IPsec packet encapsulation overhead includes at least one of an ESP header length, a tunnel IP header length, an ESP trailer length and an algorithm integrity check value, ICV, length.

12. The first communication device according to claim 10, wherein when the at least one threshold comprises two or more different thresholds, a minimum of the two or more different thresholds is selected as the threshold.

13. The first communication device according to claim 10, wherein the first communication device is further configured to:
  when the length of the IP datagram is not larger than the at least one threshold, process the IP datagram to generate the corresponding IPsec packets; and
  send the corresponding IPsec packets to the second communication device.

14. The first communication device according to claim 10, further comprising at least one of:
  the first communication device configured to obtain the at least one threshold;
  the first communication device is an end point of an IPsec tunnel;
  the two or more corresponding IPsec packets are ESP packets; and
  the first communication device is one of:
    a communicating host;
    a communicating security gateway;
    a router; and
    a server.

15. A second communication device, comprising:
a processor; and
a memory coupled to the processor, the memory containing instructions executable by the processor to configure the second communication device to:
  receive two or more Internet protocol, IP, security, IPsec, packets from a first communication device;
  process the two or more IPsec packets to obtain two or more corresponding IP packets, the two or more corresponding IP packets are fragments of an IP datagram and are generated by fragmenting the IP datagram into the two or more corresponding IP packets when a length of the IP datagram is larger than at least one threshold, the length of each of the two or more corresponding IP packets are not larger than the at least one threshold and each of the two or more corresponding IP packets is filled with fragmentation information, the fragmentation information comprising a flag in a first IP packet of the two or more IP packets, the flag indicating the IP datagram has been fragmented into at least one other IP packet, the fragmenting occurring before encapsulation security payload, ESP, processing; and
  the at least one threshold comprising two or more different thresholds, the two or more different thresholds comprising:
    a value of a path maximum transmission unit, PMTU, subtracting an IPsec packet encapsulation overhead; and
    a max data length value supported by a hardware used for packet encryption and decryption when the two or more IP packets were processed to generate the two or more IPsec packets.

16. The second communication device according to claim 15, wherein the IPsec packet encapsulation overhead includes at least one of an ESP header length, a tunnel IP header length, an ESP trailer length and an algorithm integrity check value, ICV, length.

* * * * *